Patented Sept. 5, 1944

2,357,655

UNITED STATES PATENT OFFICE 2,357,655

PROCESS FOR THE MANUFACTURE OF STRONTIUM PEROXIDE

August Hummel, Bernardsville, and William M. Driesen, Clifton, N. J., assignors to Hummel Chemical Company, Inc., New York, N. Y., a corporation of New York No Drawing. Application September 15, 1942, Serial No. 458,468

11 Claims. (Cl. 23—187)

Strontium peroxide is known to exist in several forms. One form is made by the so-called wet process of production and is identified by its very low density and its light, fluffy, powdery physical characteristics. Another form made by direct oxidation of strontium oxide is completely different in its physical characteristics and comprises discrete particles of granular or sandy character and of much greater density and is free-flowing. The ratio of the densities by volume of the fluffy and granular forms of the material is as 1:5 approximately.

United States Patent 1,325,043 to James B. Pierce refers to the first form of the material as having certain objections and discloses a method of making the second form comprising the direct oxidation of strontium oxide. This process involves pressures up to eighteen hundred pounds per square inch and temperatures up to 500° C. and is hence costly, dangerous, and wasteful.

The present invention contemplates an improved method for the manufacture of strontium peroxide in which pressures above atmospheric are not required and in which there is no loss of free oxygen. The process is characterized by its extreme simplicity and low cost of operation and minimum requirements for apparatus and materials.

In accordance with the present invention it is preferred to manufacture the strontium peroxide from strontium nitrate of good commercial quality by mixing it with sodium peroxide in molecular proportions. For effecting this reaction it is advantageous to use a saturated aqueous solution of strontium nitrate into which the sodium peroxide in granular form is introduced gradually. The temperature of this reaction is maintained below 135° F. by any suitable means to avoid decomposition of the strontium peroxide formed.

The chemical equation of the reaction is as follows:

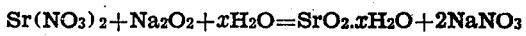

$Sr(NO_3)_2 + Na_2O_2 + xH_2O = SrO_2 \cdot xH_2O + 2NaNO_3$

The strontium peroxide produced in this reaction is in a complex hydrated form. The strontium peroxide is insoluble in water and is precipitated while the sodium nitrate formed is in solution in the excess water and can be removed by decantation or by any other means.

The hydrated strontium peroxide is now dried by mechanical means to eliminate its uncombined water and the dry powder is sintered by heating at a temperature preferably between in any suitable apparatus in the shortest possible time to avoid excessive loss of available oxygen.

The mass resulting from the sintering operation is in the form of irregular hard lumps of varying sizes, each containing a mixture of about 30% to 50% anhydrous strontium peroxide and 70% to 50% of strontium oxide, the ratio being dependent upon the time and temperature of sintering.

Example I

Hydrated strontium peroxide resulting from the reaction defined above and in dried powdery form was sintered for ten minutes at a temperature of 350° F. and the product analyzed to indicate 50% strontium peroxide and 50% strontium oxide.

Example II

Hydrated strontium peroxide resulting from the reaction defined above and in dried powdery form was sintered for ten minutes at a temperature of 500° F. and the product analyzed to indicate 30% strontium peroxide and 70% strontium oxide.

It will be noted here that the sintering operation produces two important results, first, it entirely eliminates the water of crystallization, and secondly, it combines the small powdery particles into larger denser ones.

Strontium peroxide is insoluble in water and at low temperatures does not react with the same while strontium oxide readily combines with water to form strontium hydroxide in its hydrated form $(Sr(OH)_2 \cdot 8H_2O)$. This material is difficultly soluble in water at 32° F. but its solubility increases about fifty times at 212° F.

In order to separate the sintered mixture of strontium peroxide and strontium oxide, the whole mass in its heated condition is rapidly quenched in a quantity of water greatly in excess of the amount necessary to convert the oxide into the hydrated hydroxide. Since it is essential to control the temperature of the exothermic reaction resulting from the formation and solution of the hydroxide, this quantity of water may well be regulated for that purpose. The temperature of the water can be that most easily available, say from 50° F. to 75° F. The reaction preferably is maintained at a temperature not substantially higher than 120° F. If it is not desired to use a substantially greater quantity of water than that necessary to form and dissolve the hydroxide, then some effective form of temperature control of the water into which the sin- The strontium peroxide will settle out at the bottom and the solution of strontium hydroxide may be decanted off or otherwise separated. The strontium peroxide is then washed with water to remove all of the adherent strontium hydroxide. The surface moisture adherent to the strontium peroxide is now removed in a vacuum dryer to avoid loss of available oxygen and the material is then ready for use.

The strontium hydroxide solution is treated separately with the molecular amount of hydrogen peroxide which reacts with the same to form hydrated strontium peroxide. This material is precipitated and separated from the liquid and returned to the process for subsequent conversion to the anhydrous peroxide.

It will be obvious that the reaction first mentioned herein uses sodium peroxide as a convenient source of oxygen to combine with the strontium from the nitrate. Other suitable materials may be used. Likewise strontium nitrate is not necessary as a starting material. The essential part of the process resides in the treatment of the hydrated strontium peroxide, however obtained, to convert it to the anhydrous form.

The strontium peroxide produced by the method defined above shows a very high density and can be mechanically reduced to a free-flowing granular material of sandy, discrete particles. The material in this form is highly desirable for the production of red flames in pyrotechnic and military compositions. Tracer bullets require the material in this form as an ingredient of the tracer composition.

Having thus described the invention, what is claimed as new and desired to be secured by Letters Patent is:

1. The method of manufacturing strontium peroxide which consists in reacting strontium nitrate and sodium peroxide to form hydrated sintering the dried peroxide to convert the same strontium peroxide, removing uncombined water to anhydrous strontium peroxide and strontium oxide, quenching the sintered material in water to convert the oxide to hydroxide and to dissolve the latter, removing and drying the anhydrous strontium peroxide.

2. The method of manufacturing strontium peroxide which consists in reacting strontium nitrate and sodium peroxide to form hydrated strontium peroxide, removing uncombined water, sintering the dried peroxide to convert the same to anhydrous strontium peroxide and strontium oxide, quenching the sintered material in water to convert the oxide to hydroxide and to dissolve the latter, removing and drying the anhydrous strontium peroxide, treating the hydroxide solution with hydrogen peroxide to convert it to hydrated strontium peroxide, and returning the latter to the process.

3. The method of producing strontium peroxide from hydrated strontium peroxide comprising sintering the hydrated strontium peroxide at a temperature not substantially greater than 500° F. to rapidly convert the same to a mixture of anhydrous strontium peroxide and strontium oxide, quenching the sintered mass in sufficient water to convert the oxide to the hydroxide and to dissolve the latter, separating the strontium peroxide from the solution, and drying the same.

4. In the method of claim 3 the additional step of reacting the hydroxide solution with hydrogen peroxide to convert it to hydrated strontium peroxide and returning the latter for sintering.

5. The method of producing strontium peroxide from hydrated strontium peroxide comprising sintering the hydrated strontium peroxide at a temperature not substantially greater than 500° F. and for a period not substantially longer than ten minutes to convert the same to a mixture of strontium oxide and a substantial percentage of anhydrous strontium peroxide, quenching the sintered mass to convert the oxide to the hydrate, dissolving the hydrate in water, separating the peroxide from the solution, and drying the same at low temperature for use.

6. The method of producing strontium peroxide from hydrated strontium peroxide comprising sintering the hydrated strontium peroxide at a temperature not substantially greater than 500° F. and for a period not substantially longer than ten minutes to convert the same to a mixture of strontium oxide and a substantial percentage of anhydrous strontium peroxide, quenching the sintered mass in such excess quantity of water as to convert the oxide to the hydrated hydroxide, dissolve the latter and to hold the heat of reaction and solution to a temperature not substantially greater than 135° F., separating the peroxide from the solution, and drying the same.

7. The method of producing strontium peroxide from hydrated strontium peroxide comprising sintering the hydrated strontium peroxide at a temperature between 350° F. and 500° F. for a period of approximately ten minutes to convert the same to a mixture of from 30% to 70% of anhydrous strontium peroxide and 70% to 30% of strontium oxide, converting the oxide to hydroxide by reacting the mixture with water, dissolving the hydroxide, separating the peroxide from the solution, washing the peroxide, and drying the same in vacuum at room temperature.

8. The method of producing strontium peroxide which consists in reacting a strontium salt and a peroxide capable of forming hydrated strontium peroxide, drying the peroxide, sintering the same to form a mixture of anhydrous peroxide and oxide of strontium, separating the mixture by the use of water, washing, and drying the strontium peroxide.

9. In the method of claim 8 in which the water treatment results in a solution of strontium hydroxide, treating this solution with hydrogen peroxide to form a precipitate of hydrated strontium peroxide, separating and drying the precipitate, and returning it to the sintering stage.

10. The method of producing strontium peroxide which consists in reacting a water soluble strontium salt such as strontium nitrate, with a water soluble peroxide such as sodium peroxide, capable of forming hydrated strontium peroxide, removing uncombined water, sintering the resulting dry powder to form a mixture of strontium peroxide and oxide of strontium, separating the mixture by quenching it in water, thus converting the strontium oxide into water soluble strontium hydrate and leaving behind the strontium peroxide.

11. In the method of claim 10 in which the quenching in water results in the formation of strontium hydroxide in solution, reacting this solution with hydrogen peroxide to form a precipitate of hydrated strontium peroxide, separating and drying the precipitate and returning it to the sintering stage.

AUGUST HUMMEL.
WILLIAM M. DRIESEN.